United States Patent

[11] 3,594,919

| [72] | Inventors | Lawrence R. De Bell<br>Bethany;<br>David D. Price, Jr., Oklahoma City, both of, Okla. |
|---|---|---|
| [21] | Appl. No. | 860,292 |
| [22] | Filed | Sept. 23, 1969 |
| [45] | Patented | July 27, 1971 |
| [73] | Assignee | The Economy Company<br>Oklahoma City, Okla.<br>by said De Bell |

[54] TUTORING DEVICES
3 Claims, 5 Drawing Figs.

[52] U.S. Cl. .................................................. 35/8 A,
179/100.2 MD
[51] Int. Cl. ..................................................... G09b 5/04
[50] Field of Search ........................................... 35/8 A, 9,
35 C; 307/293; 328/129; 179/100.2 MI

[56] References Cited
UNITED STATES PATENTS
3,294,924 12/1966 Fein ........................... 35/35 (C)
3,405,461 10/1968 Joslow ........................... 35/35 (C)

*Primary Examiner*—Wm. H. Grieb
*Attorney*—Dunlap, Laney, Hessin and Dougherty

ABSTRACT: Apparatus for dissemination of programmed information for purposes of tutoring and the like. The apparatus comprising a plural channel record and playback device, each channel being connected to supply input to an audio and a control tone processing channel, respectively; the audio information being reproduced audibly for the benefit of one or more students or users, while the control tone processing channel provides selectively placed periodic control tones for purposes of controlling the playback and learning functions. The apparatus includes specific circuitry for automatically repeating a predetermined segment of recorded audio information, as well as tone discrimination means responsive to predetermined auxiliary control tones to cause periodic actuation of selected auxiliary equipment operating in coaction with the tutoring device.

INVENTORS
LAWRENCE R. DeBELLE
DAVID D. PRICE JR.
BY
ATTORNEYS

INVENTORS
LAWRENCE R. DeBELLE
DAVID D. PRICE JR.
BY
ATTORNEYS

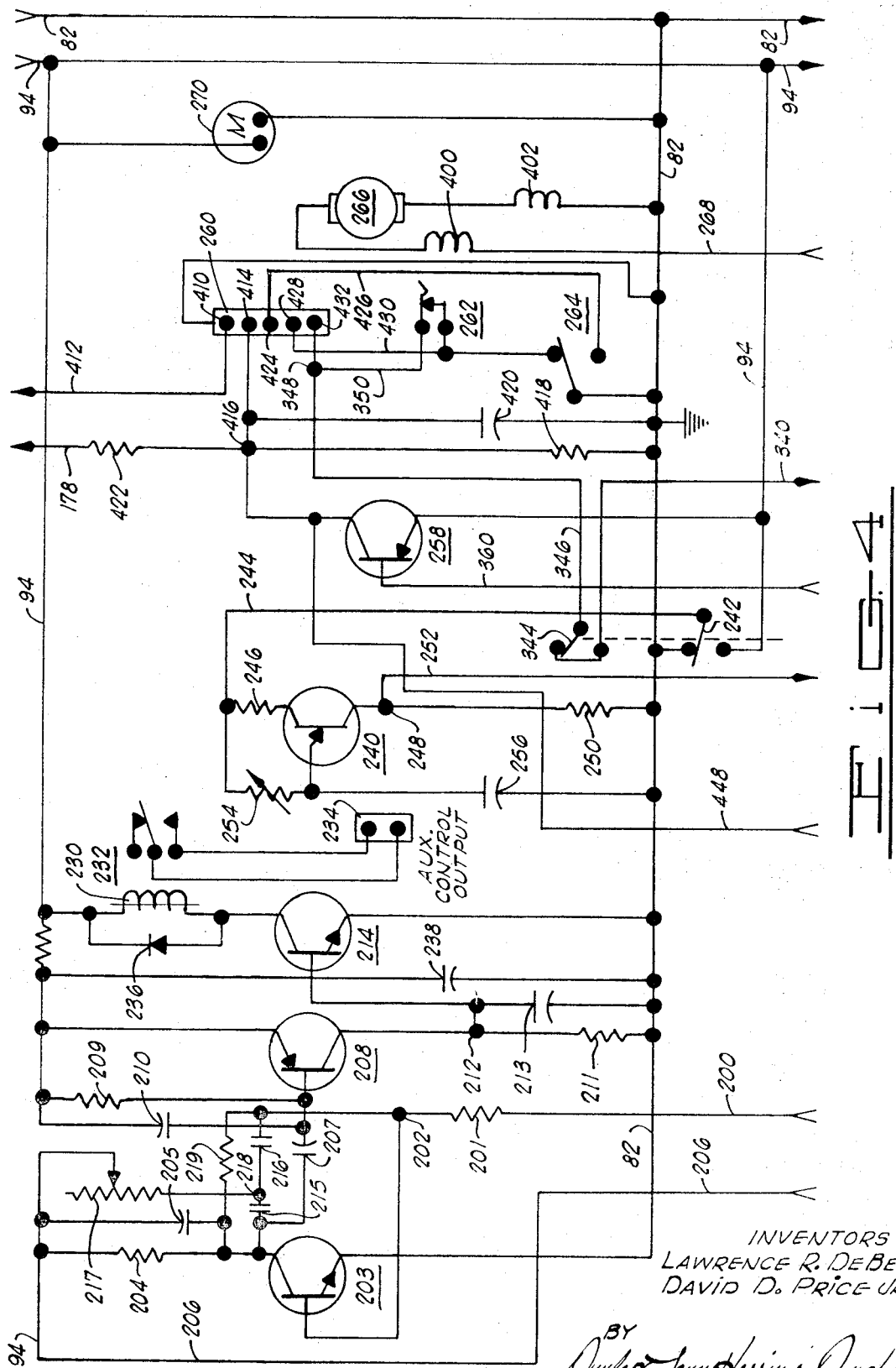

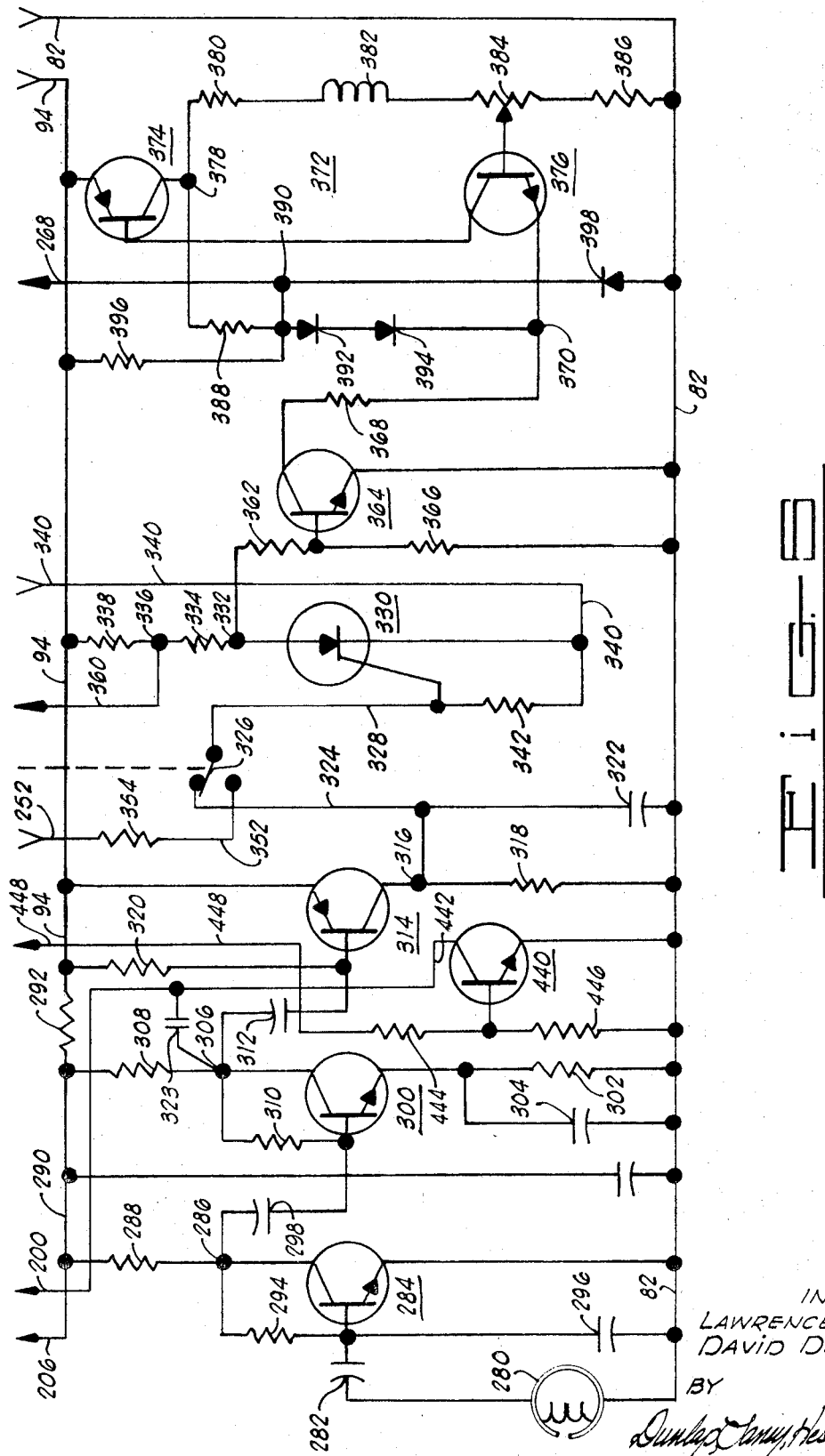

TUTORING DEVICES

BACKGROUND OF THE INVENTION

1. Field of the Invention

The invention relates generally to teaching machines and, more particularly, but not by way of limitation, it relates to improved audio information dissemination devices characterized by automatic segment repeat facility.

2. Description of the Prior Art

The prior art includes numerous types of teaching machines, both audio information and/or visual information disseminators. The prior types of apparatus have taken diverse forms as influenced primarily by the specific type and quantity of information being handled. Various tutoring devices have been designed in contemplation of operation with a suitable form of computer, and these mechanisms have still more characteristic structural requirements coincident with data processing demands. In general, the development of such tutoring machines has responded largely to operational necessities such as foolproof participation, reliability, low-power requirements, ease of programming information, nondestructability of programmed record input, recording of student results, etc.

SUMMARY OF THE INVENTION the present invention contemplates a tutoring device wherein means are provided for segmental audio information dissemination with selective segmental replay capability and specific adaptability for singular or group tutoring operations. In a more limited aspect, the invention consists of a playback assembly utilizing a plural channel record, and providing an audio output and a control tone output in parallel to a respective audio output channel and control tone channel. The control tone channel provides amplification and control function for stopping and starting the playback in response to selected control tone signals, and the audio channel provides amplification and audio output to one or more student presentation devices. Tone discrimination circuitry is provided for examining the signal in the control tone channel to detect an additional control tone which may be utilized for cueing the operation of an auxiliary information device to function in conjunction with a teaching machine.

Therefore, it is an object of the present invention to provide an inexpensive and reliable teaching machine which is suitable for a variety of applications and modes of operation.

It is also an object of the invention to provide such a teaching device which offers greater freedom of programming and, therefore, increased efficiency in presenting information to the student or user.

Finally, it is an object of the present invention to provide a teaching machine which is readily adaptable into any of a variety of tutoring systems, either individual or group networks.

Other objects and advantages of the invention will be evident from the following detailed description when read in conjunction with the accompanying drawings which illustrate the invention.

BRIEF DESCRIPTION OF THE DRAWING

FIG. 4 is a schematic diagram of the tone discrimination and control channel of the invention; and FIG. 5 is a schematic diagram of the control tone processing channel of the present invention.

DESCRIPTION OF THE PREFERRED EMBODIMENT

Figure 1:
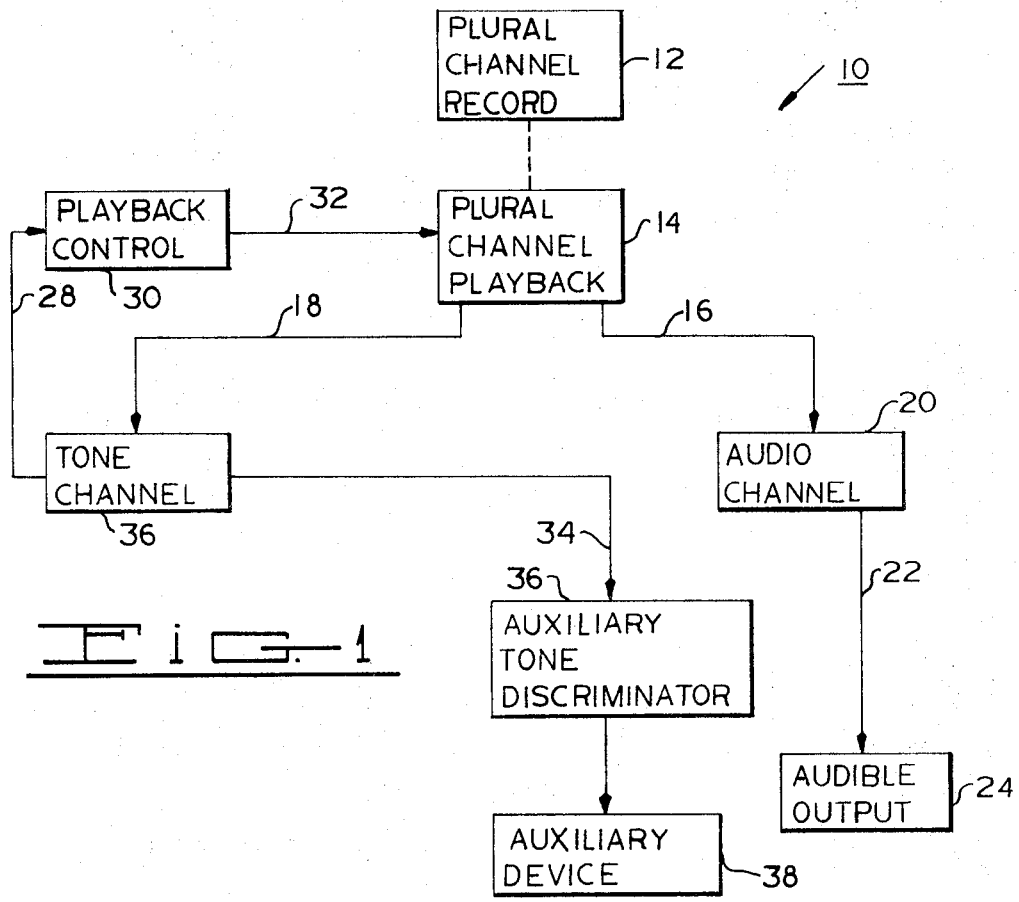
FIG. 1 is a block diagram of a teaching machine constructed in accordance with the present invention.

As shown in FIG. 1, a teaching machine 10 consists of a plural channel record 12 situatable for playback by selected plural channel playback 14 which, in turn, provided electrical signal outputs in the form of an audio information output 16 and a control tone output 18. It is contemplated that various forms of mechanism may be employed as plural channel playback 14; however, in its present form, the teaching machine 10 employs a key-control, low-power type of playback mechanism which includes mechanical drive reversal and rewind structures as will be further described below.

The audio information output on lead 16 is applied to a suitable audio channel 20 which provides necessary amplification prior to output via lead 22 to a suitable form of audible output 24. The audible output 24 may consist of one or more earphone outputs and/or loud speakers, intercommunication networks, etc.

The control tone output lead 18 is applied to a tone channel 26 which carries out the requisite amplification of the control tone signal. The control tone output from tone channel 26 is then applied via a lead 28 to a playback control 30 which, in turn, provides output control on line 32 back to the plural channel playback 14. The control on line 32 may consist of a motor control function as will be further described below. The control tone frequency is also selected in accordance with requirements which render it compatible for use with the audio information and auxiliary tone signals. For example, a tone of about 1500 c.p.s. provides the requisite functions.

An additional output 34 from tone channel 26 is utilized for the purpose of controlling auxiliary equipment. Thus, output 34 is applied to a suitable auxiliary tone discriminator 36 which serves to distinguish and amplify a control tone signal for input to a selected auxiliary device 38. The auxiliary tone may be selected to be any easily separated, constant frequency tone which is readily distinguishable from the control tone and situated in a frequency range which would not interfere with the control tone, e.g. a 100 cycle tone. The auxiliary device 38 may consist of various types of auxiliary equipment such as slide projecters, movie equipment, card punch and grading assemblies, etc.

Figure 2:
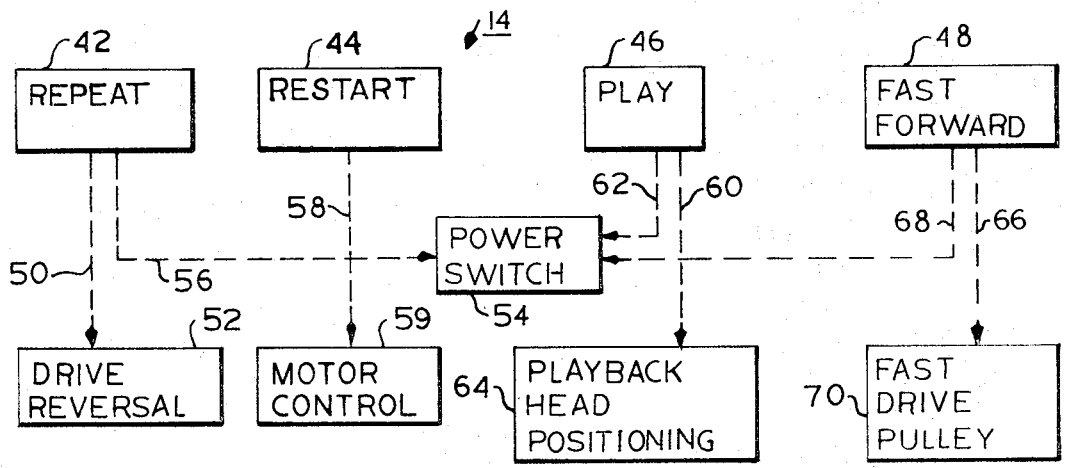
FIG. 2 is a functional block diagram depicting the playback control as employed in the invention of FIG. 1.

As stated above, one form of plural channel playback 14 is a key-operated playback mechanism and, as shown in FIG. 2, key control of functions serves to provide mechanical actuation of the various operational controls. A plurality of actuating keys 42, 44, 46 and 48 provide the operation selection of "repeat," "restart," "play," and "fast forward," respectively. The repeat key 42 provides actuation via mechanical linkage 50 to a drive reversal mechanism 52 which is a conventional form of structure. The repeat key 42 also actuated a main power switch 54 by mean of linkage 56. A restart key 44 provides a connection along link 58 to enable actuation of a motor control 59, as will be further described below.

Actuation of play key 46 provides mechanical actuation along linkages 60 and 62 to a playback head positioning device 64 and power switch 54, respectively. Similarly, depression of fast forward key 48 actuates along linkages 66 and 68 to a fast drive pulley 70 and power switch 54, respectively. Mechanical equivalents of the fast drive pulley 70 and playback head positioning device 64 are features which are readily available in various types of playback mechanisms which may be selected for use as plural channel playback 14.

Figure 3:
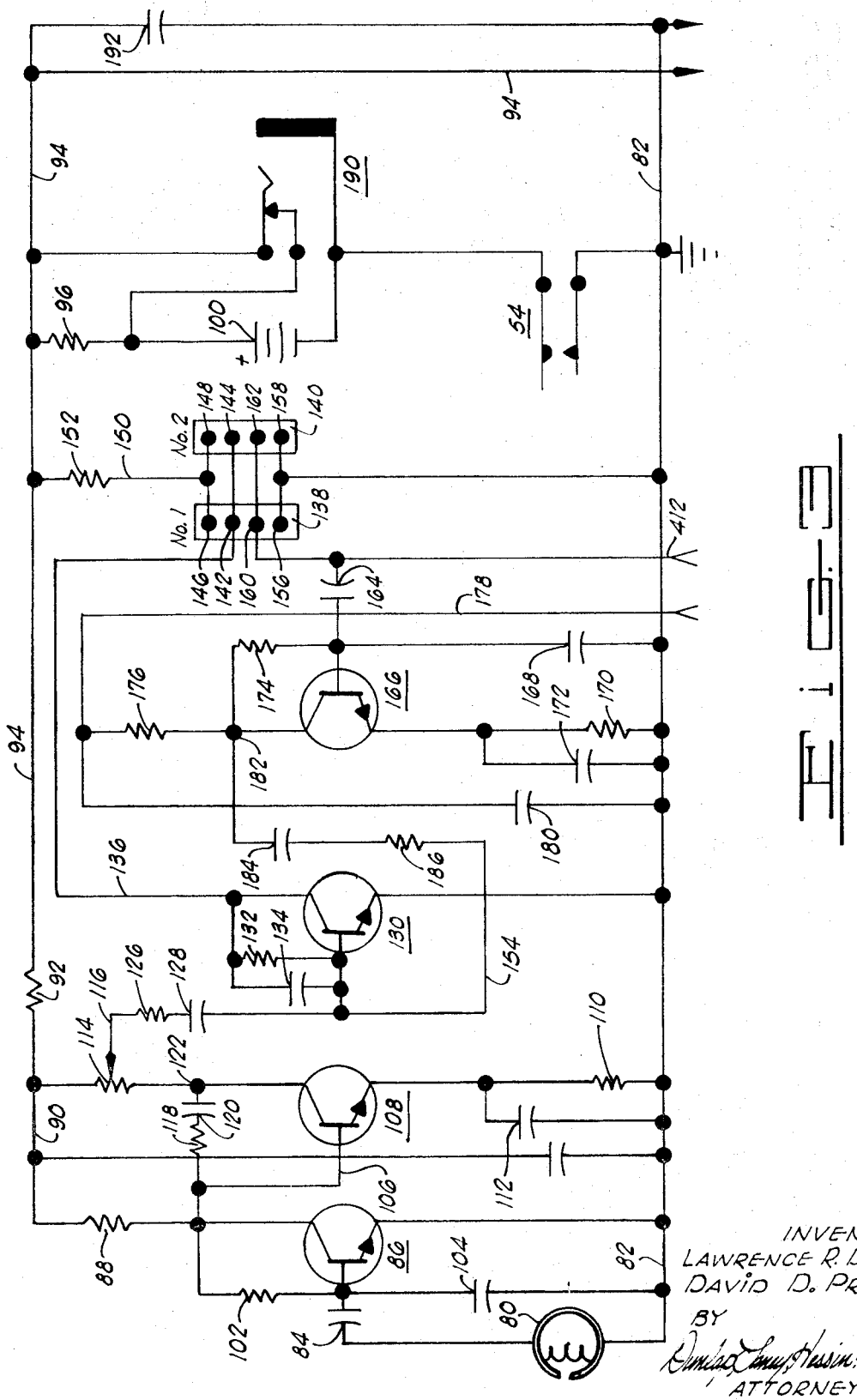
FIG. 3 is a schematic diagram of the audio processing channel of the invention.

FIG. 3 illustrates the audio channel 20 and related outputs in greater detail. Thus, a pickup head 80 of conventional type is connected between common 82 and an input capacitor 84 to play input to the base of an NPN transistor 86. The pickup head 80 may be one-half of a stereo pickup assembly, this arrangement enabling the recording of the audio information and control segments of information in conventional stereo channel array. The transistor 86 is connected common-emitter with the collector connected through a load resistor 88 to a voltage supply lead 90 as connected through a voltage dropping resistor 92. The voltage dropping resistor 92 is then connected to the main voltage supply lead 94 which derives power through another voltage dropping resistor 96 as connected directly to the positive side of a battery source 100. In one form of the invention, the battery source 100 is 7.5 v. through use of five series-connected nickel-cadmium dry cells. The amplifying transistor 86 further includes a biasing resistor 102, as connected between collector and base, and a filter capacitor 104 of suitable value is connected between the base and common 82.

An output from transistor 86 is taken from the collector and applied via lead 106 for input to the base of an NPN transistor 108. Transistor 108, a second stage of amplification, has the emitter connected through a resistor 110 to common 82, a capacitor 112 providing bypass of resistor 110, and its collector is connected through a potentiometer 114 to voltage supply lead 90. The potentiometer 114 is actually the volume control and provides a variable output via wiper lead 116, as will be further described. A series-connected resistor 118 and capacitor 120 are connected between base and collector of transistor 108.

Audio information output on lead 116 is applied through a resistor 126 and an input capacitor 128 for application to the base of an NPN transistor 130. The transistor 130 is connected common-emitter with a parallel-connected resistance 132 and capacitance 134 connected between collector and base, and with the collector connected to an audio output lead 136 which is applied directly to the audio output. That is, in the case as shown, audio output lead 136 is applied to parallel-connected NO. 1 and No. 2 headset receptacles 138 and 140. The audio output lead 136 is connected to the receptacle connectors 142 and 144, in parallel, with return through headset receptacle connectors 146 and 148 through a lead 150 and voltage dropping resistor 152 to the voltage supply lead 94.

An additional audio output in the form of microphone response of a student or user is also applied to transistor 130 via input lead 154. The microphone response input originates at the student position with input through receptacles 138 and 140, i.e. receptacle connectors 156 and 158 to common and receptacle connectors 160 and 162 as applied through input capacitor 164 to the base of transistor 166 is decoupled through a capacitor 168 while the emitter is connected through a parallel-connected resistor 170 and capacitor 172. The collector of transistor 166 is biased from the base by resistor 174 and connected through a load resistor 176 to a voltage supply lead 178 which is enabled only during playback stop condition, as will be further described below. A capacitor 180 is connected from energizing lead 178 to common 82 and the microphone response at output from transistor 166 is derived from collector junction 182 through a blocking capacitor 184 and a resistor 186 for input to the base of transistor 130, the audio output amplifier.

An input receptacle 190 makes provision for input of a remotely located power source. A normally open spring switch 54, connected between the negative side of battery or power source 100 and common, provides grounding or common connection of the power source to enable energization of the plural channel playback 14 during conditions of "play," "restart,"and "fast forward," as shown in FIG. 2. A relatively large value of capacitance 192 provide power supply filtration as it is connected between the main voltage supply lead 94 and the ground or common lead 82.

Referring now to FIG. 4, an auxiliary tone input (as will be described) may be applied at input 200 to a resistor 201 and junction 202 which is connected to the base of an NPN transistor 203. Transistor 203 is connected common-emitter with the collector connected through a resistor 204 and parallel-connected capacitor 205 to a power source as applied via input lead 206, to be further described below. Auxiliary tone signal output from the collector of transistor 203 is applied through a coupling capacitor 207 to the base of a PNP transistor 208. The PNP transistor 208 is connected common-emitter to main voltage supply lead 94 while the base is biased by a parallel network of resistor 209 and capacitor 210. The collector is connected through a load resistor 211 to common lead 82, and an output from junction 212, as decoupled by a capacitor 213, is applied as input to the base of an NPN transistor 214.

A tuning network is utilized to enable band detection of the auxiliary control tone signal. Such selection is enabled by the series-connected capacitors 215 and 216 affixed between the collector of transistor 203 and input junction 202, and a potentiometer 217 connected between voltage supply lead 206 and a junction 218 between capacitors 215 and 219 between input junction 202 and the collector of transistor 203 provides DC stabilization.

Transistor 214 is connected common emitter with the collector connected through a coil 230 of a relay 232 to the voltage supply lead 94. The normally open contacts of relay 232 are closed upon conduction of transistor 214 to provide a switch closure indication to an auxiliary control output receptacle 234. A diode 236 provides a quenching network as connected across the coil 230 of relay 232 and a filter capacitor 238 is connected between common 82 and voltage supply.

A unijunction transistor 240 functions as a time delay stage for timing the duration of rewind energization so that a predetermined segment of information will be replayed upon each "repeat" energization. Thus, switch contact 242 responsive to the repeat key (FIG. 2) is momentarily displaced from the normally grounded position into contact with voltage supply lead 94 such that supply lead 244 energizes unijunction transistor 240 into conduction. The lead 244 is connected through a resistor 246 to the base $B_2$ of transistor 240, while the base $B_1$ is connected through a junction 248 and resistor 250 to common 82. Upon conduction of transistor 240, a pulse developed at junction 248 is conducted via lead 252 to motor control circuitry as will be further described below. The delay of conduction of transistor 240 is determined by setting of the variable resistance 254 as connected to the emitter of transistor 240 as well as to a timing capacitor 256.

An NPN transistor 258 as connected to a remote control receptacle 260 carries out a stop condition function which will be further described below. A receptacle 262, a normally closed contact, allows remote control by some start switch other than the restart key 44 (FIG. 2) and a start enabling switch 264. A drive motor 266 is connected between common 82 and a lead 268 leading to the motor energizing circuit as will be described. The meter 270 provides an indication of circuit power as it is connected between the voltage supply 94 and common 82.

Referring now to FIG. 5, the control tone channel includes a pickup head 280 connected between common lead 82 and an input capacitor 282 to the base of an NPN transistor 284, a first stage of amplification. Transistor 284 is connected common-emitter with the collector connected through junction 286 and a load resistor 288 to a voltage supply lead 290. The voltage supply lead 290 is reduced in value in response to load resistor 292 connected in series to the voltage supply 94. The base of transistor 284 is biased from the collector by means of a resistor 284 and connected through a capacitor 296 to common 82.

An output from transistor 284 is available at junction point 286 for application through a coupling capacitor 298 to the base of an NPN transistor 300. Transistor 300 is connected as a successive amplification stage with the emitter connected through a parallel-connected resistor 302 and capacitor 304 to common 82, and the collector being connected through a junction point 306 and load resistor 308 to voltage supply lead 290. The base is biased from the collector by means of a resistor 310. Output from junction point 306 is then applied through a coupling capacitor 312 to the base of a PNP transistor 314 which is connected common-emitter with its collector connected through an output junction 316 and load resistor 318 to common 82. The base of transistor 314 is biased from voltage supply lead 94 by mean of a resistor 320, and a filter capacitor 322 is connected between junction point 316 and common 82. An auxiliary control tone output is also taken at junction point 306 through a capacitor 323 for output via line 200 to the auxiliary control stages (FIG. 4).

A converted control tone output from junction point 316 is connected via a lead 324 through the normally closed contacts of a switch 326 which is actuated by the "repeat" key 42 (FIG. 2). In its normal position, the wiper output of switch 326 supplies control tone signal from lead 324 onto a lead 328 for connection to a gate electrode of a semiconductive controlled rectifier 330, e.g. a conventional silicon device. The anode of the semiconductive controlled rectifier 330 is connected through a junction point 336 and second load resistor 338 to voltage supply lead 94. The cathode of controlled rectifier 330 is connected directly to a lead 340 which is connected back to control circuitry of FIG. 4, as will be described. A biasing resistor 342 is connected between gate electrode and cathode of controlled rectifier 330.

The lead 340 connected to the cathode of controlled rectifier 330 is connected (see FIG. 4) through both contacts of switch 344 which is aligned for ganged actuation in response to the depression of the "repeat" key 42 (FIG. 2). This supplies anode energizing to controlled rectifier 330 as switch 344 (FIG. 4) is connected through a lead 346 to a junction 348 and lead 350 for conduction through normally closed jack switch 262 and enable switch 262 to common 82. Also, upon depression of the "repeat" key 42, switch 326 (FIG. 5) is connected to a lead 352 and resistor 354 to the lead 252 from base $B_1$ of unijunction transistor 240.

When triggered into conduction in response to a control tone, the controlled rectifier 330 provides an output from junction point 336 via lead 360 which is applied as input to the base of transistor 258, (FIG. 4). Also, conduction of controlled rectifier 330 causes removal of voltage present at junction point 332, which is connected through a resistor 362 to the base of an NPN transistor 364, the base being biased by means of a common connected resistor 366. Transistor 364 is connected common-emitter with the collector connected through a resistor 368 to a junction point 370 of a motor speed regulation circuit 372.

The regulation circuit 372 is comprised of a PNP transistor 374 and an NPN transistor 376 connected in a series configuration as will be described. The emitter of transistor 376 is connected to a junction 370 while its collector is connected directly to the base of transistor 374. The emitter of transistor 374 is connected directly to voltage supply lead 94 while the collector is connected to a junction point 378. Junction point 378 is then connected to a voltage dividing network consisting of a resistor 380, an interference choke 382, a potentiometer 384, and a fixed resistor 386 to common 82. The wiper output from potentiometer 384 is connected to the base of transistor 376. Junction point 378 is also connected through a resistor 388 to a junction point 390 which is connected to the motor energization lead 268. A pair of series-connected diodes 392 and 394 are connected between junction point 390 and the emitter of transistor 376 to assure a constant voltage differential there between, and junction point 390 is further biased from voltage supply lead 94 by means of a relatively high resistance 396. Still another regulating diode 398 is connected between junction point 390 and common lead 82 to provide motor inductive transient suppression.

Referring again to FIG. 4, the motor energization lead 268 is connected through a suitable value of interference choke 400 to the DC motor 266, viz, a conventional permanent magnet type of DC motor with return through such as an interference choke 402 to the common lead 82. The remote receptacle 260 includes various receptacle connections such 0s are employed in conjunction with a master recording teaching unit which is utilized to program and organize lesson materials. Thus, a receptacle connector 410 is connected to a lead 412 which leads to the microphone receptacle connectors 160 and 162 of FIG. 3. A receptor connector 414 conducts a recorder energization voltage from a remote source to a junction 416 which is connected to the collector of transistor 258, the stop condition control stage. The junction point 416 is biased from common 82 by means of a resistor 418 and a capacitor 420 while it is connected through a resistor 420 to the lead 178 which is connected to energize transistor 166 (FIG. 3). The capacitor 420 serves as a time delay holding capacitor as it functions with transistor 258.

Additional connections of remote receptacle 260 consist of a receptacle connector 424 which serves to connect lead 426 thru switch 264 to common 82. A receptacle connector 428 provides remote connection to a lead 430 and the normally closed contact of start enabling switch 264. Finally, receptacle connector 432 provides a remote connection to the junction point 348 and lead 346 to the switch section 344.

Also in the circuitry of FIG. 5, an auxiliary tone mute function is provided by an NPN transistor 440. Transistor 440 is connected common-emitter with collector output connection via lead 442 to the auxiliary tone input 200 (FIG. 4). The base of transistor 440 is connected between voltage divider resistors 444 and 446 connected between common 82 and a lead 448 tied to junction 416 (FIG. 4), the collector of transistor 258, the stop condition control stage.

OPERATION

In its basic form, the recorded educational material consists of a plural channel recording having at least one channel for selected segments of audio information and a cooperating adjacent channel for carrying control tone signals spaced therealong in predetermined programmed relationship. The audio information, length and spacing of information segments and, therefore, the disposition of the control tone signals will all be placed in accordance with the information dissemination program as originally compiled or structured into the lesson record.

Upon insertion of a lesson record in the teaching machine 10, the student or user may begin information dissemination by depression of the "play" key 46 (FIG. 2) which, in turn, depresses the power switch 54 to energize the motor 266 such that playback commences. The audio playback head 80 plays back the information and the played back electrical signals are amplified through transistors 86, 108 and 130 for output via lead 136 to each of the No. 1 and No. 2 output receptacles 138 and 140, respectively. The student or user will occupy only one output receptacle 138 while the remaining or No. 2 receptacle 140 is available for a teacher or other monitoring attendant.

The instant segment of audible information will continue until detection of a control tone signal. That is, an accompanying control tone on a parallel record channel is played back by pickup head 280 for amplification through transistors 284, 300 and 314 and subsequent output through the normal position of switch section 326 of the repeat switch and, finally, to the gate electrode of controlled rectifier 330 to fire it into conduction.

Upon conduction of controlled rectifier 330, the positive voltage present at junction point 332 is shunted to common 82, which, as reflected at the base of transistor 364, serves to cut off transistor 364 to stop rotation of the motor 266. That is, the cutting off of transistor 364 places an increasing or more positive voltage at junction point 370 to cause cutoff of transistor 376 to reduce the effective voltage available at junction point 390 for application along motor energizing lead 268 to the DC motor 66.

Once the playback 14 has been stopped by the detected presence of a control tone signal to cause firing of the semiconductive controlled rectifier 330, the teaching machine 10 will remain in its quiescent or stop position to enable a period of time during which student and/or teacher queries and responses may be attended. Such response measures may take various forms ranging from simple audible answering through recorded response and grading of such. Then, when the student desires to move on to the next segment of audio information, he merely presses "restart" key 44 to actuate restart switch 264 which removes the common 82 from connection with lead 350, junction point 348 and lead 346. Lead 346 being affixed to the normally closed repeat switch section 344 and lead 340 to the cathode of semiconductive controlled rectifier 330. This removal of ground from the cathode of controlled rectifier 330 quenches conduction thereby to allow transistor 364 once again to conduct such that the motor regulation circuits 372 function to energize the drive motor 266. The student would then receive the next segment of audible information whereupon the plural channel playback 14 would again be stopped upon detection of a control tone signal by pickup head 280 for amplification and control function as previously described.

In the event that the student receives a segment of information and, for some reason, may want a repeat of such information, the playback machine 10 is capable of automatically playing back a predetermined time-amount of prior played audio information. The student presses the "repeat key" 42 which actuates drive reversal 52 and the main power switch 54 as well as the ganged switch section 344, 242 and 326. Switch section 344 serves to provide a momentary break in the ground circuit to the cathode of the controlled rectifier 330, sufficient break to insure quenching or cutoff of the controlled rectifier 330. The switch section 326 chances the gate electrode input lead 328 of semiconductive controlled rectifier 330 to that voltage on lead 252 from the unijunction transistor 240, the time delay stage. Depression of switch section 242 connects voltage supply lead 94 to lead 244 to begin charging of the R–C network (potentiometer 254 and capacitor 256) connected to the emitter of transistor 240.

After a time delay in accordance with the resistance of potentiometer 254, sufficient voltage will be developed on the trigger electrode of transistor 240 to cause the unijunction transistor to conduct. This conduction, in turn, develops a positive voltage at junction point 248 for conduction via lead 252 and switch section 326 (depressed) to once again energize the gate electrode of semiconductive controller rectifier 330 so that it goes into conduction to cut off transistor 364 and stop energization of the DC drive motor 266. The setting up of potentiometer 254 will vary the time delay or amount of audio record repeat in accordance with whatever the exigencies of the particular application.

In the event that the student or a teacher recognizes the need for advance of the lesson material, it is merely necessary to press the fast forward key 48 which, in turn, actuates a mechanical fast drive pulley 70 to hasten the tape drive speed by some selected degree.

It is contemplated that a boom mike headset may be employed; however, a conventional headset will more probably be used in most applications. If a boom mike is used, an oral response feeds back through the No. 1 and/or No. 2 receptacles 138 and 140 and amplifier 166 such that the student will hear himself from the mike, from the amplifier, and/or from his own headset. If an instructor or other monitoring agent is using a boom mike headset when the teaching machine 10 is stopped, as by detection of a control tone signal, the amplifier circuits of FIG. 3 are enabled such that the student and teacher may converse via the mike and headset connections.

It should be understood that the teaching machine 10 need not be physically present for the audio and restart features to be available. That is, it may well be that the teaching machine 10 be disposed at a teacher's console with the audio and restart controls made available at a student's desk by means of a cable connection. It is also contemplated to employ an amplifier speaker system such that the audio output teaching machine 10 may be presented to a large group, i.e. to or more students, with other organizing and grading functions being instituted in combination therewith. Such a system would also employ a number of output jacks such that the group may function via headset, if desired, to pursue independent rates of learning. Still a further mode of operation is contemplated wherein the teaching machine 10 is employed in combination with a suitable playback-recorder instrument. Such coaction would include functions wherein the teaching machine 10 and the playback-recorder would be alternately energized and capable of recording on a separate record student responses to certain taped stimuli. In this mode, a teacher would not have to listen to the original audio stimuli in order to evaluate recorded student responses.

The foregoing discloses a novel teaching machine which is compact and of rugged construction while still being economical and conservative as regards the energizing power requirements. Such a device combines all of the desirable attributes of audio information tutoring facility while being relatively simple to operate. Such a teaching machine also has the added capabilities of being usable in a large variety of student-teacher situation, i.e. either singular or group student usages, and it may be operated in coaction with various other related types of audio and/or visual teaching devices, stimulus devices, grading devices, etc.

Changes may be made in the combination and arrangement of elements as heretofore set forth in the specification and shown in the drawings; it being understood that changes may be made in the embodiments disclosed without departing from the spirit and scope of the invention.

What we claim is:

1. A teaching machine for dissemination of selected recorded information comprising:
    an information record having plural record channels with audio information recorded on at least one channel and a related control tone periodically recorded on at least one parallel channel;
    playback transport means receiving said information record and including drive means for imparting movement to said information record;
    first pickup and amplifier means for playing back said at least one channel of audio information to produce an audio output signal;
    second pickup and amplifier means for playing back said at least one channel of periodic control tone to produce a periodic control tone signal;
    reproducing mean receiving said audio output signal and providing an audible information output;
    semiconductive controlled rectifier means which is energized into conduction upon receipt of one of said periodic control tone signals input to the gate electrode of said controlled rectifier;
    amplifier means which is rendered nonconductive in response to conduction of said semiconductive controlled rectifier to deenergize the drive means of said playback transport means to cease movement of said information record;
    restart means actuatable to disable said controlled rectifier means to permit starting of said play back transport means;
    reverse means which is energizable to reverse said playback transport means to back up said information record; and
    time delay means energized upon actuation of said reversing means and actuatable upon expiration of said time delay to deenergize said reversing means.

2. A teaching machine as set forth in claim 1 wherein said time delay means comprises:
    unijunction transistor means;
    resistance-capacitance time delay means connected to provide the trigger input to energize said unijunction transistor means into a conductive state; and
    switch means actuatable to energize said reverse means, and to energize said resistance-capacitance time delay means and said unijunction transistor means such that said unijunction transistor means conducts after said predetermined time delay to deenergize said reverse means.

3. A teaching machine as set forth in claim 1 which is further characterized to include:
    auxiliary tone means recorded in superposition on said control tone channel of said information record;
    tone discrimination means receiving said control tone signal from said second playback means to provide an auxiliary tone signal output;
    auxiliary control output means energized by said auxiliary tone signal to provide a predetermined control output.